United States Patent [19]

Calabrese

[11] Patent Number: 5,433,843

[45] Date of Patent: Jul. 18, 1995

[54] MARINE AQUARIUM WITH A DIALYSIS WATER PURIFICATION SYSTEM

[76] Inventor: Gerry Calabrese, 1865 SW. 31st Ave., Hollywood, Fla. 33009

[21] Appl. No.: 204,630

[22] Filed: Mar. 2, 1994

[51] Int. Cl.$^6$ ............................................ A01K 63/04
[52] U.S. Cl. .................................. 210/138; 210/169; 210/195.2; 210/259; 210/321.72; 210/416.2; 119/259
[58] Field of Search ...................... 210/138, 169, 195.2, 210/259, 257.2, 321.72, 416.2, 644; 119/259

[56] References Cited

PUBLICATIONS

"ASTM Desingation: 1141-52", pp. 180-181.
"Sea-Salt", Technical Bulletin, Lake Produts Co.
"Fritz Super Salt", Fritz Chemical Company, Oct. 1984.

*Primary Examiner*—Robert A. Dawson
*Assistant Examiner*—Robert James Popovics
*Attorney, Agent, or Firm*—Herbert L. Lerner; Laurence A. Greenberg

[57] ABSTRACT

A marine aquarium or a marine holding system has a tank connected to a closed loop circulation system. The closed loop communicates with an open loop through an osmotic and hydrostatic pressure exchange. A dialysis apparatus for removing undesirable elements is commonly placed into the closed loop and the open loop system. A separate holding tank for a dialysate solution is provided in the open loop system. Canister filters for preparing the dialysate solution by removing unwanted particles and chemicals are tied into the system as well. Peristaltic pumps provide for precise, simultaneous dispensing of a dialysate and a contaminated solution to opposite sides of a semipermeable membrane. The open loop system is connected with a fresh water source, and it includes solenoids, digital times for scheduling events, float switches and time delay relays. The components are connected in such a way as to automatically remove waste products from the closed water loop system. An alternative system also provides for reconstituting the post dialysis water with trace elements that might have been removed by the dialysis process.

10 Claims, 1 Drawing Sheet

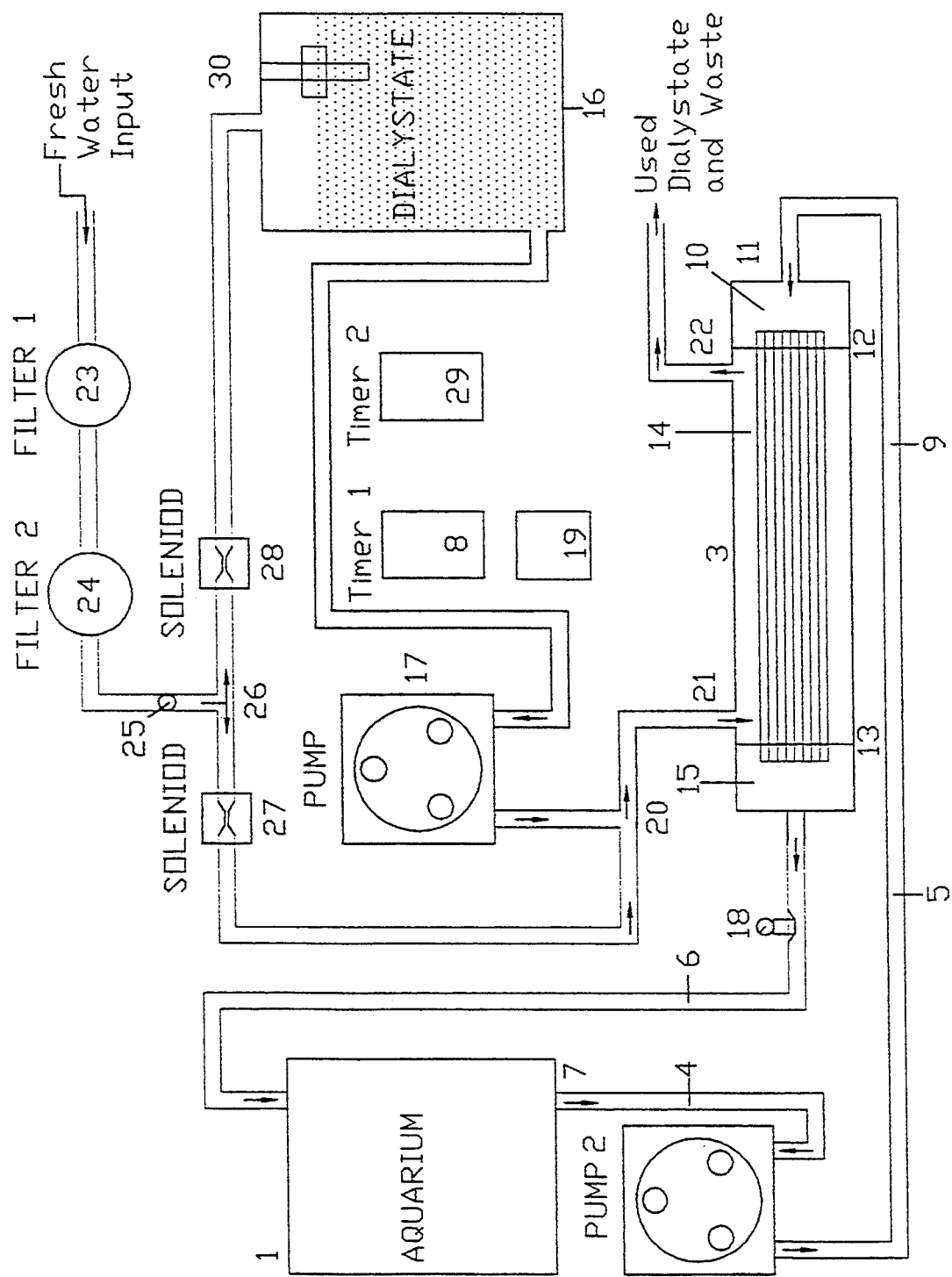

MARINE AQUARIUM WITH A DIALYSIS WATER PURIFICATION SYSTEM

BACKGROUND OF THE INVENTION

FIELD OF THE INVENTION

The invention relates to a system for removing waste byproducts of aquatic life maintained in a closed water system. And in addition, this invention relates to a system for removing contaminants other than those directly related or generated by aquatic life.

Ammonia is the main byproduct of protein metabolism excreted by most aquatic animals and, unless removed efficiently and continuously, it will make life in an aquarium unsupportable.

Ammonia rapidly attains toxic concentrations in the confines of an aquarium. It exists as a mixture of free ammonia ($NH_3$) and ionized ammonia ($NH_4$, ammonium) in equilibrium. This does not mean that they are present in equal proportion, but that they are converted from one to the other at an equal rate. Free ammonia is uncharged and is a gas dissolved in water. It can pass unimpeded through membranes such as fish gills. This allows it to interfere with the normal excretion of ammonia and is believed to account for its toxicity. Ionized ammonia is a charged particle and does not exist as a gas. It cannot pass through membranes and it is therefore considered to be relatively nontoxic. Ammonia can be removed from an aquarium by depleting either free or ionized ammonia. Since it is in equilibrium, removing either component will ultimately remove both components.

Prior art configurations use ion exchangers to remove ionized ammonia, but only in fresh water. The presence of even low concentrations of salts in fresh water interferes significantly with ammonia removal by ion exchange. The most prevalent material used for this is zeolite, a natural mineral, more commonly known as cat litter.

One of the most conventionally utilized prior art processes uses the classical reaction of ammonia with formaldehyde to form methenamine as the ammonia removal.

Another prior art approach is biofiltration, an effective mode for removing ammonia, nitrites, and nitrates from marine or freshwater aquariums. In those systems, the water is percolated through a filter or reactor containing appropriate bacteria on a carrier or support. Some genera of anaerobic bacteria that utilize lactate may also be used to reduce nitrates, but that approach has shortcomings.

Three genera of bacteria, omnipresent in the environment, can usually establish themselves in the aquarium environment and metabolize the inorganic nitrogen compounds that would otherwise accumulate there: Nitrosomonas, Nitrobacter, and Thiobacillus. Nitrosomonas convert aquarium ammonia to nitrite, which Nitrobacter convert to nitrate, which Thiobacillus anaerobically convert to nitrogen gas.

Nitrosomonas are short gram-negative rods of about 0.8 by 1.5 u. They are obligate chemolithotrops, strictly aerobic, that convert ammonium to nitrite. Nitrobacter are also short gram-negative rods, about 0.7 by 1.5 u, strictly aerobic, obligate chemolithotrops, that convert nitrite to nitrate. Thiobacillus are short gram-negative rods, about 0.5 by 2 u, strictly autotropic and facultatively anaerobic. They require reduced sulfur compounds as an energy source, converting them to sulfate, using nitrate as an electron acceptor to form nitrogen gas. Carbon dioxide is their only source of carbon. In the presence of oxygen they utilize ammonia.

One of the problems associated with a biological system is that excessive dissolved organics are inhibitors to all these genera.

While the afore-mentioned bacteria can exist as free swimming agents, they do much better on a support matrix. A vast number of different configurations have been known heretofore, with each new generation touted as the best supporting structure for the bacteria to proliferate on, and providing information on how the supporting structure should be placed in any given system. Both Nitrobacter and Nitrosomonas require oxygen.

For that reason, aeration and circulation are essential. The prior art has endeavored to maximize oxygen levels in the aquarium to accommodate these genera. Both genera are intolerant of free ammonia and this can be the main cause of difficulties in getting an aquarium to cycle. "Cycle", in this context, is defined as successfully establishing the above-mentioned genera of bacteria.

For that reason, the art recommends that animals or ammonia should be introduced gradually to avoid sharp increases in ammonia concentration in this system.

Effective use of Thiobacillus requires anaerobic conditions (no oxygen). This can be achieved by passing the water slowly enough through special substrate so there is sufficient oxygen depletion from the water. Thiobacillus must also have a continuous supply of reduced sulfur compounds such as thiosulfate, or bisulfite.

An alternative prior art method of removing nitrates is the promotion of vigorous algae growth, either by harvesting algae in the aquarium itself or in a separate algae filter. This usually requires vitamin and trace element supplements as well as intense lighting.

The art distinguishes three types of filtration: mechanical, biological, and chemical. Mechanical filtration has to do with the (mechanical) removal of insoluble particulates from the water by some sort of sieving device, such as floss or foam. Biological filtration is the removal of ammonia and nitrite waste from the water by Nitrosomonas and Nitrobacter bacteria, respectively, and is the most essential of the filtration types used in the aquarium art. Chemical filtration is the direct removal of solutes by adsorption. The most important function of the chemical filtration is the removal of organic waste. This is vital because organic waste is both inhibitory to the biological filter and increases the load on the biological filter. The most common chemical adsorbent is activated carbon. Other types of chemical filtration include synthetic adsorbents, ion exchangers, and zeolite. In marine water, ion exchangers can remove some nitrite and nitrate, but have no significant effect on ammonia.

The marine aquarium environment is relatively well defined. The principal factors that need to be managed are pH, alkalinity, ionic integrity, trace element supplementation, stress, temperature, and the avoidance of chlorine, chloramine, and excessive phosphates.

Fundamental to the success of a healthy aquarium no matter what size, is the stability of the aquarium environment. The prior art relies on scheduled methodical water changes to remove wastes not normally removed by present filtration methods. Prior art also relies on water changes to restore the aquarium to a balanced ionic condition. No system exists today that is fully successful in the removal of organic waste and other contaminants in aquariums, other than water changes. However, unless large proportions of the aquarium water are exchanged during a water change or very frequent water changes are performed, the effect of the dilution of organic wastes and an improvement of ionic conditions are insignificant and insufficient.

Shortcomings of the prior art methods can be best shown by way of an exemplary situation: Nitrate ($NO_3$) is presumed to be the unwanted substance. While in a realistic situation there are always more than just one substance to be eliminated from the closed aquarium system, we will, for the purpose of this example, only concentrate on nitrate. The aquarium water quality is tested by means of a test kit for pH, alkalinity, ammonia, nitrite, nitrate, oxygen, hardness, etc. By combining the results of these tests with a few mathematical calculations, one can come to a conclusion on how to rectify poor conditions.

We will assume a 100 gallon aquarium fully stocked with fish and invertebrates and a fully functioning filtration system.

A nitrate reading is taken at 100 mg/L of $NO_3$. A partial water change of no more then 25% per month is recommended by one manufacturer of synthetic salt (other manufacturers recommend to exchange no more than 10% to 20% at any one time). After a 25% water change is completed, a new reading of 75 mg/L NO3 is recorded. That is a 25% improvement. Next month a nitrate reading is taken at 125 mg/L NO3, which is a normal result because there is still a constant input of $NO_3$ into the aquarium. Another 25% water change is completed and the new reading is 93.75 mg/L $NO_3$, only 6% better than the first water change with a $NO_3$ reading of 100 mg/L. The third month nitrate is checked and it is 143.75 mg/L $NO_3$. A partial water change of 25% is performed and the new reading is 107.8 mg/L $NO_3$. After only three months, water changes have shown to be ineffective in lowering the nitrate content in the aquarium to an acceptable level.

Various options are available. The number of fish in the aquarium could be reduced. The frequency of the water changes past the recommended amount of 25% per month could be increased. Or, maybe the fish and invertebrates could be subjected to increasingly poor water conditions and hope for the best. Nitrates were chosen for this example because of their difficulty to be removed in prior art systems.

Nitrates do not rise and fall precipitously, and nitrate content can be used as a barometer of overall water quality. The chemistries of nitrates and marine water are such that the removal of nitrates from sea water by either physical or chemical processes is very ineffective. As noted above, prior art methods rely on the removal of nitrates by anaerobic denitrification or the harvesting of vegetative growth to supplement water changes as the means of controlling nitrates. Hobbyists and professional maintenance personnel of public aquaria have kept fish in high nitrate water (over 100 mg/L nitrate) for years with no perceptible ill effects on fish and many invertebrates. However, low nitrate concentrations become important when the objective is the maintenance and growth of delicate corals in reef systems. Low nitrates also help control the proliferation of hair algae.

Nitrate is only one of the many elements not wanted in the aquarium water. Phosphate, excessive organics, nitrite, ammonia, and chloramines are some others. Phosphate, is a major nutrient requirement for microalgae, along with nitrate and some trace elements. Therefore the removal of phosphate is beneficial to a marine aquarium. If one could, so to speak, dial in on exactly what one wants removed and what one wants to stay, without having a separate apparatus for each element, such a device would be truly revolutionary in the art of maintaining a closed water system such as an aquarium.

SUMMARY OF THE INVENTION

It is accordingly an object of the invention to provide a water purification system for marine aquaria, which overcomes the hereinafore-mentioned disadvantages of the heretofore-known devices of this general type and which makes it possible, in the context of a relatively inexpensive system, to simply set exactly what is to be removed and what is to be retained in the system, without having a separate apparatus for each element.

With the foregoing and other objects in view there is provided, in accordance with the invention, a water purification system for a marine aquarium, comprising:

a closed loop system including a first pump hydraulically communicating with an outlet of a water tank, a membrane unit having an inlet communicating with the first pump and an outlet communicating with an inlet of the water tank;

the membrane unit including a housing with an interior partitioned into an inlet chamber, an exchange chamber and an outlet chamber, a semipermeable membrane hydraulically connecting the inlet chamber and the outlet chamber and extending through the exchange chamber; and an open loop system hydraulically communicating with the exchange chamber, the open loop system including a dialysate storage tank, a fresh water supply line communicating with the exchange chamber, and a second pump disposed between the dialysate storage tank and the fresh water supply line, the second pump being means for mixing a dialysate from the dialysate storage tank into water flowing in the fresh water supply line and feeding a dialysate solution to the exchange chamber.

One of the great advantages of the system according to the invention is the fact that the dialysate in the storage tank may be held at 30–40 times the concentration of the finally mixed dialysate solution. The system may thus be constructed quite compact and accessible.

In accordance with another feature of the invention, the open loop system further includes first filter means connected between the cleaned water inlet and the second pump for filtering particulate matter from water entering at the cleaned water inlet, and an activated carbon filter connected between the first filter means and the second pump.

In accordance with an additional feature of the invention, the purification system includes valve means disposed between the cleaned water inlet and the second pump for shutting off a fresh water supply to the second pump, and timer means connected to the valve means, to the first pump and to the second pump for automatically turning on the first and second pumps and automatically opening the valve means. Additionally, there may be time delay means connected between the timer means and the first pump for causing the first pump to turn on after the second pump. Generally, the time delay may be about 20 seconds, allowing a certain pressure to build up on the dialysate side before the contaminated water side is filled.

In accordance with added feature of the invention, the first and second pumps are peristaltic pumps.

With the above and other objects in view, there is also provided, in accordance with the invention, an improved water purification system of a marine aquarium of the type having an aquarium tank holding saltwater and having a contaminated water outlet and a clean water inlet, the improvement which comprises:

a closed loop with a first pump and a dialysis unit hydraulically connected between the contaminated water outlet and the cleaned water inlet of the aquarium tank;

dialysate supply means connected to the dialysis unit for adjusting a dialysate solution and supplying the dialysate solution to the dialysis unit and for balancing an osmotic exchange in the dialysis unit between contaminated water from the aquarium tank and the dialysate solution.

In accordance with a further feature of the invention, the dialysis unit includes a housing with a first inlet hydraulically communicating with the first pump and a first outlet hydraulically communicating with the cleaned water inlet of the aquarium tank, an exchange chamber defined in the housing, a semipermeable membrane extending between and hydraulically connecting the first inlet and the first outlet, a second inlet hydraulically connecting the dialysate supply means with the exchange chamber, and a second outlet communicating with the exchange chamber for removing contaminants from the exchange chamber.

In accordance with a concomitant feature of the invention, the dialysate supply means include a fresh water supply line connected to the dialysis unit, a dialysate storage tank and a second pump, preferably a peristaltic pump, connected to the fresh water supply line for mixing a dialysate solution from fresh water and dialysate.

The preferred embodiment of the present invention alleviates the difficulties of the prior art by providing means for separating chosen contaminants from a closed system by the development of a dialysis device which can be used in a most beneficial way for marine aquariums.

When the contaminated aquarium water is pumped through the dialyzer, pressure and concentration gradients between the contaminated aquarium water and the dialysis solution remove toxic wast and excess water. Because the aquarium water contains toxic wastes and higher concentrations of other ionic electrolytes, these solutes diffuse across the membrane into the solution. Any solute which is more concentrated in the dialysis solution diffuses into the aquarium water.

The three physical principles of dialysis are diffusion, osmosis and hydrostatic pressure. Diffusion is the movement of particles from an area of higher concentration to an area of lesser concentration. The difference in concentrations is the concentration gradient. In aquarium dialysis, high concentrations of uremic toxins and electrolytes in the water diffuse across the semipermeable membrane into the dialysis solution (dialysate) where the concentrations are lower.

Osmosis is the passive transport of water across a semipermeable membrane from an area of low particle concentration to an area of high particle concentration (of from high water concentration to low water concentration). In certain pressure gradient situations in the aquarium dialysis process, some of the aquarium water passes into the dialysate solution. Such water loss from the aquarium can be offset by adding fresh water directly into the aquarium tank.

Hydrostatic pressure is exerted by the weight of a column of water in its container. This pressure may be positive or negative relative to the environment. For example if a container has semipermeable walls, positive hydrostatic pressure inside the container would expel the fluid through the walls. Conversely, if a negative hydrostatic pressure exists outside the container, the fluid would be "pulled" through the walls of the container. Positive and negative hydrostatic pressures are used during aquarium dialysis to move excess water and some dissolved solutes rapidly from the aquarium tank. Such rapid removal of water is called ultrafiltration.

In the case of salt water, if the membrane is placed between a pure brine solution and a contaminated brine solution, the contaminants (dialyzable substances) will flow through the membrane due to the pressure gradient across the membrane. The system, as in all physical and chemical processes, will proceed until equilibrium is achieved.

In this invention, a constant clean dialysate solution is on one side of the membrane and the contaminated solution on the other, the contaminated solution will become less contaminated and the dialysate solution will acquire the contaminants. If elements are included in the dialysate solution which are desirable in the contaminated solution, then there will be an equilibrium of those elements on either side of the membrane and those elements will not pass through, i.e. the equilibrium situation is maintained. Another solution is to add a mixture of elements to the effluent side of the apparatus to reconstitute the filtered solution. The application can be compared to a dialysis machine for human blood (hemodialysis). A patient's blood is pumped on one side of a semipermeable membrane and a clean dialysate solution containing elements desirable on the other. The result is a loss of contaminants in the patient's blood without changing the patient's blood. The preferred embodiment addresses the problems of correct flow and proportions of the dialysate and the contaminated marine water.

Quite importantly, also, the preferred embodiment provides for unassisted automatic operation, and predetermined scheduled operation. The preferred embodiment can be used with existing filtration techniques as a supplement or as a single system to provide desirable water conditions. The preferred embodiment can be sized up or down to accommodate any size closed system.

Finally, the dialysate solution may be reclaimed after it leaves the exchange chamber. In that case, it will be purged of the waste and the waste will be removed.

Other features which are considered as characteristic for the invention are set forth in the appended claims.

Although the invention is illustrated and described herein as embodied in a water purification system for marine aquaria, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

BRIEF DESCRIPTION OF THE FIGURE

The FIGURE is a schematic view of a closed loop water purification system according to the invention.

DESCRIPTION OF THE PREFERRED EMBODIMENT

Referring now to the single FIGURE of the drawing in detail, there is seen a closed loop system including a aquarium 1 (or holding tank), a pump 2 and a membrane unit 3. The loop is closed with a line 4 connecting the aquarium 1 with the pump 2, a line 5 connecting the pump 2 with the membrane unit 3, and a line 6 closing the loop back to the aquarium 1. It will be understood from the description that the loop is not "closed" in a strict sense, as there is a certain amount of diffusion across the semi-permeable membrane in the membrane unit 3.

An inlet connector 7 of the line 4 communicates with the aquarium 1 at an area of concentrated dissolved aquarium waste, such as a filter sump or a protein skimmer column. Contaminated water from the aquarium 1 is routed through the water line 4 to an inlet at the pump 2. The pump 2 is a peristaltic pump which is capable of metering fluid to fine ml increments under pressure. Such pumps are available, for example, from the firm G. H. Stenner under model number D2418-KD. That pump is also adjustable and it is operated at 110 V. It is electrically connected to a digital timer 8 which provides for one-minute incremental scheduling. The timer 8 allows an operator to schedule events as the operator wishes.

As contaminated water exits the pump 2 through the fluid line 5, it is passed through a fine screen filter 9. Small particles are thus removed before the water enters the membrane unit 3. By way of example, the membrane unit 3 may be obtained from ALTHIN CD MEDICAL of Miami Lakes, Fla., under model No. 6100 (C-DAK Artificial Kidney). The contaminated water, which has been purged of large particulate matter, enters a membrane unit chamber 10 at a stub connector 11.

The membrane unit 3 comprises thousands of semi-permeable tubes or membranes. The housing is configured such that the contaminated solution is forced through the center of the membranes. Seal rings 12 and 13 are provided for that purpose at the ends of the membrane tubes. There are essentially three separate cavities in the membrane housing, namely the inlet chamber 10, a central exchange chamber 14 and an outlet chamber or exit chamber 15.

As contaminated water is forced through the membranes towards the exit chamber 15, the contaminants in the solution are forced through the exchange chamber 14. As far as understood, an osmotic exchange and a hydrostatic exchange takes place in the exchange chamber 14, in that those materials which are not balanced at the outside of the membrane tubes, due to the osmotic/hydrostatic pressure difference, and due to the process of separation by diffusion accross the membranes, permeate through the membrane into the flow of an open, secondary loop.

The secondary loop includes a fresh water input, filters, a dialysate storage tank 16, a pump 17 and the necessary connecting lines. A mixture of fresh water and dialysate solution is pumped through the exchange chamber 14, so as to establish an ideal solution of the aquarium constitutes which aids in the process of the dialysis (separation by diffusion).

When the contaminated solution reaches the exit chamber 15, it has lost its contaminants and it proceeds to a regulator 18 through an outlet stub of the membrane housing. The regulator 18 is used to increase the pressure on the water in the exit chamber 15. Such an increase also increases the rate at which contaminants will pass through the membranes in the membrane unit. The water which leaves the regulator 18 and returns to the aquarium 1 through the line 6 is in a much healthier ionic condition with respect to a healthy, buffered marine environment.

A clean dialysate solution is required to surround the membranes in the membrane unit, so as to create an osmotic pressure differential and also to define what passes through the membranes. Whatever element or compound is present in the dialysate solution as well as in the contaminated water in equal proportion, will tend to stay in the solution inside the membrane tubes. Any element which is not present in the dialysate solution will attempt to pass through the membrane to the exchange chamber 14, i.e. into the dialysate solution. As mentioned above, the exchange mechanism is defined as osmosis. The system as described makes it possible, for the first time in the aquarium art, to exactly zero in on which contaminants or elements are desireable to be removed and which contaminants or elements are to be retained in the water.

The dialysate solution is stored in the tank 16. The pump 17 is preferably identical to the pump 2, i.e. it is a peristaltic pump with at least similar specifications as the pump 2. The pump 1 is also connected electrically to the timer 8. The pump 2 is electrically connected to a time delay relay 215, via which its start is delayed until after the pump 17 has been in operation for approximately 20 seconds. This period allows clean dialysate solution to completely fill the exchange chamber 14, before contaminated solution has had a chance to build up pressure and possibly rupture some of the membranes. As the dialysate solution exits the pump 17, the dialysate from the tank 16 is mixed with clean fresh water 1 at a junction 20. At that point the solution becomes diluted with water and becomes the final dialysate solution before entering the exchange chamber 14 through an inlet stub 21 of the membrane housing. The dialysate solution accumulates contaminants from the water solution in the exchange chamber and it exits the membrane housing through an outlet stub 22. Used dialysate, i.e. dialysate contaminated with waste removed from the tank water, is routed to a suitable drain.

Fresh water enters the system through two filters 23 and 24, the first of which is preferably a 1 micron rated pleated cartridge filter for removing particles that might be in the water supply line. The second filter 24 is an activated carbon filter, which is essentially used to remove chlorine from the incoming water. From the filter 24, the water flows through a needle valve 25, from where it reaches a T-connector 26. Solenoids 27 and 28 control the water flow to the pump 17 and to the dialysate tank 16, respectively. The solenoid 27 is electrically connected to the timer 8 and it is opened to allow water flow when the timer 8 is activated. The solenoid 28 is electrically connected to a timer 29 and the electrical connection is interrupted by a float switch 30 in the tank 16, when the dialysate tank 16 is filled to a given level. If the float switch 30 is in the lower position and the timer 29 is turned on, then the solenoid 28 is opened, allowing water to enter the tank 16. The tank 16 is filled with sodium chloride (water softener salt) and water. The NaCl is dissolved to saturation, so as to make a syrupy dialysate solution. Since the sodium chloride dissolves to saturation, the dialysate solution has a well defined specific gravity and when this mixture is combined at the junction 20, the salt content can be identically matched to that of the aquarium by regulating the peristaltic pump 1 output.

The salt equilibrium thus attained prevents the membrane from stripping the marine aquarium water of its sodium chloride and other salt compositions. Additionally, the NaCl content in the aquarium may be increased or decreased as desired. Other trace elements can be added to the dialysate solution if these elements are desirable to remain in the aquarium water.

It should be understood that the system may be completely automated. It is within the reach of the person of skill in the art to provide the necessary sensors and control systems for automating the system. Finally, the system does not require the use of living bacteria to remove ionic impurities from the marine water.

Sea water substitutes are outlined in various publications as, for instance, in the government standard "ASTM Designation: 1141-52", pp. 180–181, and are commercially available from Lake Products Co., St. Louis, and from Fritz Chemical CO., Dallas.

I claim:

1. A marine aquarium in combination with a dialysis water purification system, comprising:
    a closed loop system including a first pump hydraulically connected with an outlet of a marine aquarium; a membrane unit having an inlet fluidically connected with said first pump and an outlet fluidically connected with an inlet of the marine aquarium;
    said membrane unit including a housing with an interior partitioned into an inlet chamber, an exchange chamber and an outlet chamber, a semipermeable membrane hydraulically connecting said inlet chamber and said outlet chamber and extending through said exchange chamber; and
    an open loop system hydraulically connected with said exchange chamber, said open loop system including a dialysate storage tank, a fresh water supply line connected with said exchange chamber, and a second pump disposed between said dialysate storage tank and said fresh water supply line, said second pump being means for mixing a dialysate from said dialysate storage tank into water flowing in said fresh water supply line and feeding a dialysate solution to said exchange chamber.

2. The purification system according to claim 1, wherein said open loop system further includes first filter means connected between said fresh water inlet and said second pump for filtering particulate matter from water entering at said fresh water inlet, and an activated carbon filter connected between said first filter means and said second pump.

3. The purification system according to claim 1, including valve means disposed between said fresh water inlet and said second pump for shutting off a fresh water supply to said second pump, and timer means connected to said valve means and to said second pump for automatically turning on said second pump and automatically opening said valve means.

4. The purification system according to claim 1, including valve means disposed between said fresh water inlet and said second pump for shutting off a fresh water supply to said second pump, and timer means connected to said valve means, to said first pump and to said second pump for automatically turning on said first and second pumps and automatically opening said valve means.

5. The purification system according to claim 4, including time delay means connected between said timer means and said first pump for causing said first pump to turn on after said second pump.

6. The purification system according to claim 1, wherein said first and second pumps are peristaltic pumps.

7. An improved water purification system of a marine aquarium having an aquarium tank holding saltwater and having a contaminated water outlet and a cleaned water inlet, the improvement which comprises:
    a closed loop with a first pump and a dialysis unit hydraulically connected between the contaminated water outlet and the cleaned water inlet of the aquarium tank;
    dialysate supply means connected to said dialysis unit for adjusting a dialysate solution and supplying the dialysate solution to said dialysis unit and for balancing a hydrostatic and osmotic exchange in said dialysis unit between contaminated water from the aquarium tank and the dialysate solution.

8. The water purification system according to claim 7, wherein said dialysis unit includes a housing with a first inlet hydraulically connected with said first pump and a first outlet hydraulically connected with the cleaned water inlet of the aquarium tank, an exchange chamber defined in said housing, a semipermeable membrane extending between and hydraulically connecting said first inlet and said first outlet, a second inlet hydraulically connecting said dialysate supply means with said exchange chamber, and a second outlet fluidically connected with said exchange chamber for removing contaminants from the exchange chamber.

9. The water purification system according to claim 7, wherein said dialysate supply means include a fresh water supply line connected to said dialysis unit, a dialysate storage tank and a second pump connected to said fresh water supply line for mixing a dialysate solution from fresh water and dialysate.

10. The water purification system according to claim 9, wherein said second pump is a peristaltic pump.

* * * * *